(12) United States Patent
Ghorbani et al.

(10) Patent No.: US 12,450,602 B2
(45) Date of Patent: Oct. 21, 2025

(54) MULTI-CHANNEL AUTHENTICATION USING DELEGATED CREDENTIALS

(71) Applicant: Shopify Inc., Ottawa (CA)

(72) Inventors: Siavash Ghorbani, Toronto (CA); Carl Rivera, Tuxedo Park, NY (US)

(73) Assignee: Shopify Inc., Ottawa (CA)

( * ) Notice: Subject to any disclaimer, the term of this patent is extended or adjusted under 35 U.S.C. 154(b) by 1136 days.

(21) Appl. No.: 17/244,125

(22) Filed: Apr. 29, 2021

(65) Prior Publication Data

US 2022/0351202 A1 Nov. 3, 2022

(51) Int. Cl.
| | |
|---|---|
| G06Q 20/40 | (2012.01) |
| G06Q 20/32 | (2012.01) |
| G06Q 20/36 | (2012.01) |
| G06Q 30/0601 | (2023.01) |
| H04L 9/40 | (2022.01) |
| G06Q 20/38 | (2012.01) |

(52) U.S. Cl.
CPC .......... *G06Q 20/40* (2013.01); *G06Q 20/322* (2013.01); *G06Q 20/326* (2020.05); *G06Q 20/3674* (2013.01); *G06Q 30/0633* (2013.01); *H04L 63/08* (2013.01); *G06Q 20/3821* (2013.01)

(58) Field of Classification Search
CPC ...... G06Q 20/16; G06Q 20/409; G06Q 30/06; G06Q 20/36; G06Q 20/4016; G06Q 30/0641; G06Q 20/10; G06Q 20/405; G06F 21/6209; G06F 16/23
USPC ........................................................ 709/217
See application file for complete search history.

(56) References Cited

U.S. PATENT DOCUMENTS

| | | | | |
|---|---|---|---|---|
| 6,473,738 B1 * | 10/2002 | Garrett | ............... | G06Q 30/0633 |
| | | | | 705/26.8 |
| 7,437,368 B1 * | 10/2008 | Kolluri | ................. | G06F 16/951 |
| | | | | 705/14.54 |
| 10,296,759 B1 * | 5/2019 | Holenstein | .............. | G06F 9/466 |
| 10,366,429 B2 * | 7/2019 | Isaacson | ............ | G06Q 30/0625 |
| 10,387,858 B2 * | 8/2019 | Novak | ................... | G06Q 20/14 |
| 10,417,702 B2 * | 9/2019 | Vernal | ..................... | G06Q 40/00 |
| 10,819,785 B2 * | 10/2020 | Sarin | ...................... | H04L 63/126 |
| 10,867,292 B2 * | 12/2020 | Lin | ..................... | G06Q 20/3224 |
| 11,068,897 B2 * | 7/2021 | O'Toole | .................. | H04W 4/02 |
| 11,113,695 B2 * | 9/2021 | Shah | .................... | G06Q 20/405 |
| 11,210,657 B2 * | 12/2021 | Joseph | .................. | G06Q 20/36 |
| 11,272,004 B2 * | 3/2022 | Sarin | ...................... | H04W 4/023 |
| 11,403,646 B2 * | 8/2022 | Seal | ....................... | G06Q 20/206 |
| 11,665,235 B2 * | 5/2023 | Sarin | ...................... | G06Q 20/16 |
| | | | | 709/217 |

(Continued)

*Primary Examiner* — Olusegun Goyea
(74) *Attorney, Agent, or Firm* — Foley & Lardner LLP

(57) ABSTRACT

Disclosed herein are methods and systems for electronic authentication using delegated credentials to complete checkout and payment operations on a trusted device of a user. A computing system is structured to perform operations comprising receiving transaction information corresponding to an incomplete checkout operation, transmitting at least a subset of transaction information to a customer device, causing the customer device to generate and display a notification comprising a request for user authorization to complete the incomplete checkout operation, receiving customer input indicative of instructions to complete the incomplete checkout operation, and, responsive to receiving customer input, completing the incomplete checkout operation.

21 Claims, 8 Drawing Sheets

(56) References Cited

U.S. PATENT DOCUMENTS

| | | | | |
|---|---|---|---|---|
| 2011/0178897 | A1* | 7/2011 | Balasubramanian | G06Q 30/04 |
| | | | | 709/201 |
| 2015/0052061 | A1* | 2/2015 | Anderson | G06Q 20/409 |
| | | | | 705/44 |
| 2016/0210626 | A1* | 7/2016 | Ortiz | G06Q 20/40 |
| 2016/0260084 | A1* | 9/2016 | Main | G06Q 20/401 |
| 2016/0260090 | A1* | 9/2016 | Healy | G06Q 20/326 |
| 2017/0017958 | A1* | 1/2017 | Scott | G06Q 20/40 |
| 2017/0330181 | A1* | 11/2017 | Ortiz | G06Q 20/12 |
| 2018/0053011 | A1* | 2/2018 | East | G16H 40/67 |
| 2018/0114216 | A1* | 4/2018 | Joseph | G06Q 20/40145 |
| 2018/0253727 | A1* | 9/2018 | Ortiz | G06Q 20/023 |
| 2018/0260867 | A1* | 9/2018 | Lin | G06Q 20/405 |
| 2019/0197546 | A1* | 6/2019 | O'Toole | H04W 4/02 |
| 2019/0199793 | A1* | 6/2019 | Sarin | H04L 63/126 |
| 2019/0205917 | A1* | 7/2019 | Ericson | G06Q 30/0633 |
| 2019/0318325 | A1* | 10/2019 | Kadiwala | G06Q 20/322 |
| 2019/0325445 | A1* | 10/2019 | Anderson | G07G 1/0036 |
| 2020/0168015 | A1* | 5/2020 | Rosenberg | G07C 9/00571 |
| 2020/0279265 | A1* | 9/2020 | Seal | G06Q 20/409 |
| 2020/0380611 | A1* | 12/2020 | Honeycutt | G06Q 40/12 |
| 2021/0044654 | A1* | 2/2021 | Sarin | G06Q 20/16 |
| 2021/0049634 | A1* | 2/2021 | Ericson | G06Q 30/0633 |
| 2021/0105620 | A1 | 4/2021 | Navarro et al. | |
| 2021/0109599 | A1* | 4/2021 | Harris | G06V 20/20 |
| 2021/0125266 | A1* | 4/2021 | Ramesh | H04W 4/021 |
| 2021/0224182 | A1* | 7/2021 | Chen | G06K 7/1095 |
| 2021/0295355 | A1* | 9/2021 | Bostock | G06N 20/00 |
| 2021/0303525 | A1* | 9/2021 | Amancharla | G06F 11/1435 |
| 2021/0350406 | A1* | 11/2021 | Ericson | G06Q 30/0239 |
| 2021/0392151 | A1* | 12/2021 | Lakhani | H04L 63/20 |
| 2021/0406900 | A1* | 12/2021 | O'Toole | H04L 67/55 |
| 2022/0124148 | A1* | 4/2022 | Sarin | H04L 67/1095 |
| 2022/0198036 | A1* | 6/2022 | Bayat | G06Q 20/385 |
| 2023/0098665 | A1* | 3/2023 | Ericson | G06Q 30/0641 |
| | | | | 705/14.23 |

* cited by examiner

FIG. 2

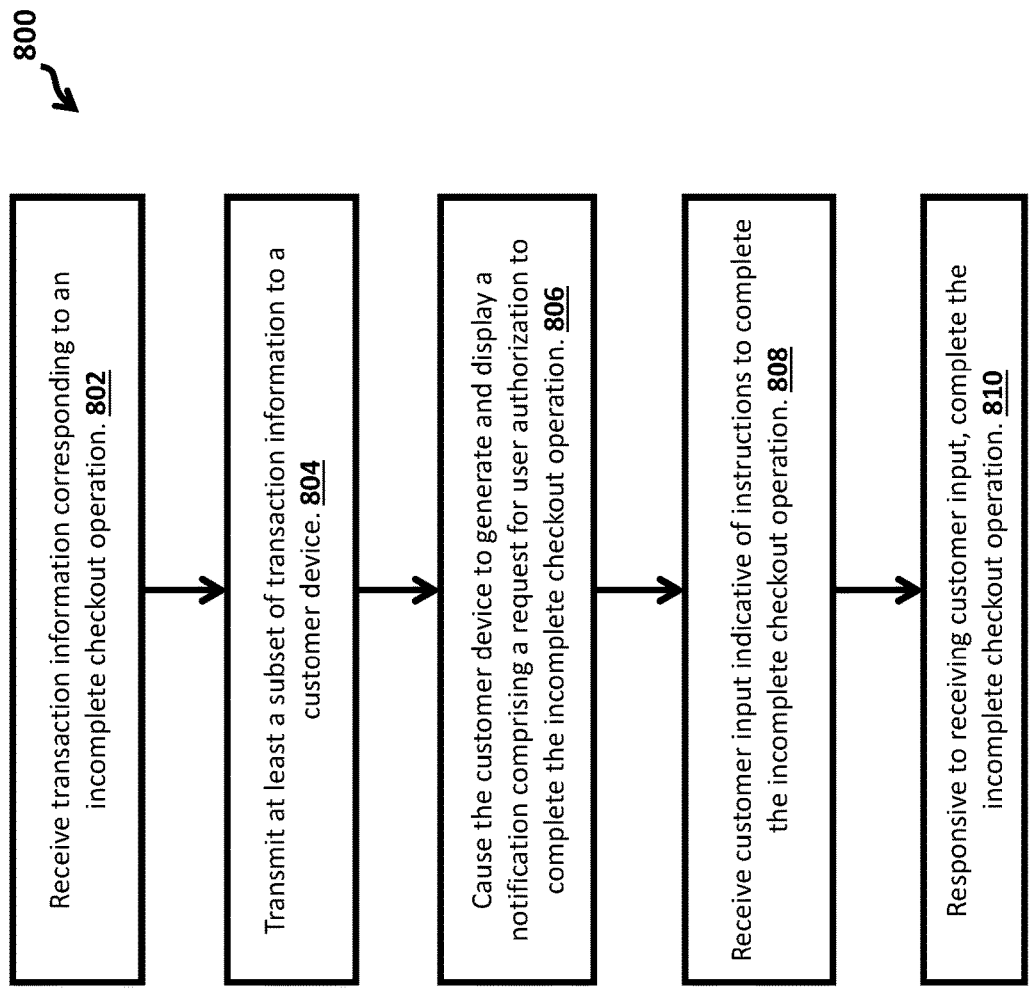

MULTI-CHANNEL AUTHENTICATION USING DELEGATED CREDENTIALS

TECHNICAL FIELD

This application relates generally to electronic authentication, and particularly to multi-device and multi-channel authentication. More specifically, this application relates to multi-channel authentication using delegated credentials.

BACKGROUND

Individuals may use multiple computing devices throughout a typical day. The computing devices may include mobile phones, desktop computers, laptops, tablets, and/or immersive reality devices. Each computing device on which the user desires to conduct a transaction may require different authentication protocols. Accordingly, users must abide by the authentication protocols for different devices and may need to submit information, such as payment information or other personal information, using different authentication protocols. This process can be inefficient and potentially exposes the user to security issues.

Some user computing devices may be electronically connected (paired) to one another to exchange data. However, communication channels established between two electronically connected devices may not provide a level of security sufficient for electronic data interchange (EDI) in financial transactions, which may require transmission of personally identifiable information (PII), such as name, address, telephone number, and credit card number.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

FIG. 8 shows execution steps for authenticating a user via using delegated credentials, according to an embodiment.

DETAILED DESCRIPTION

Figure 1:
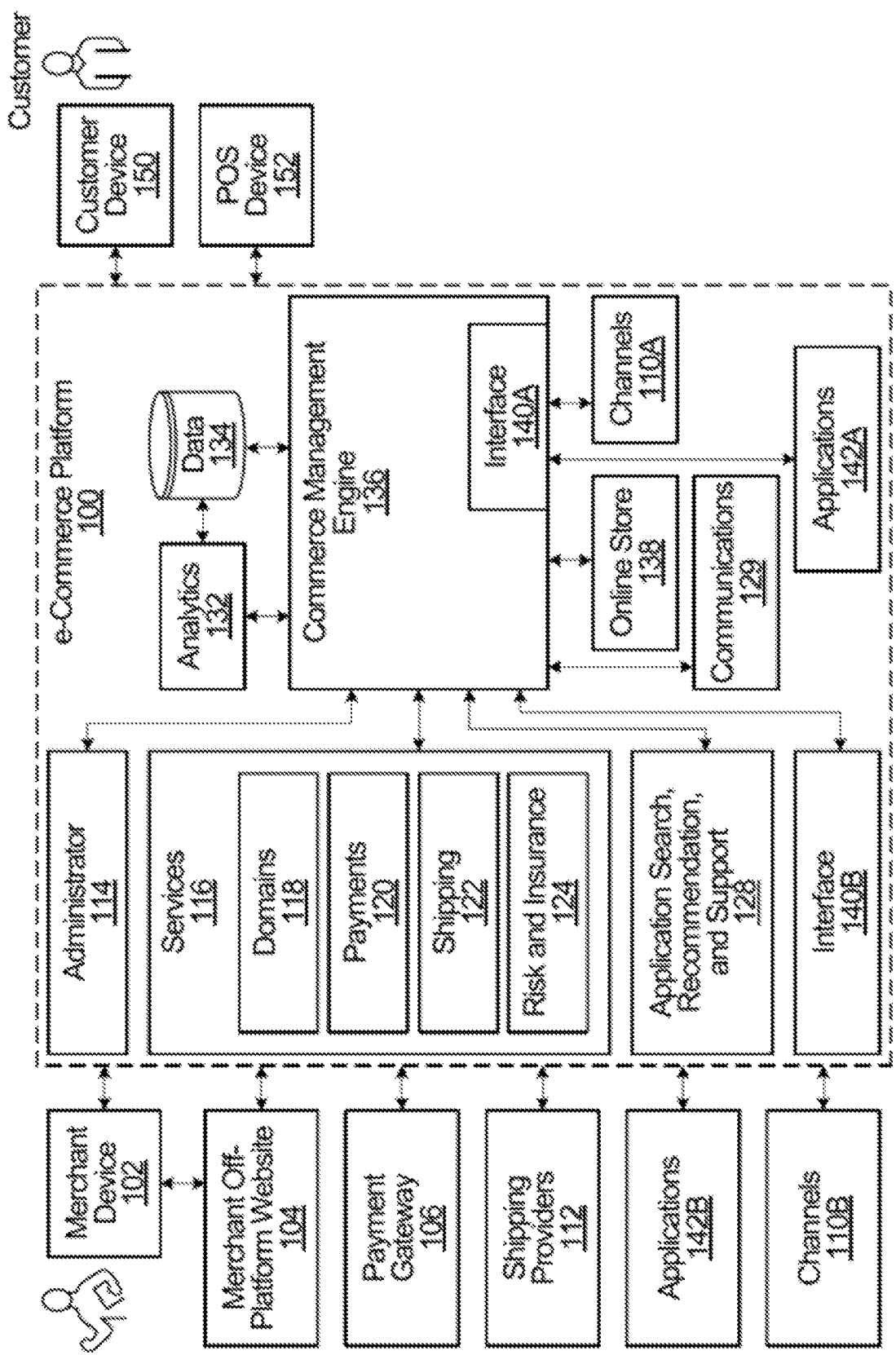
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

It is desirable for a user (also sometimes referred to herein as a buyer or a customer) initiating a transaction using a computing device (e.g., a mobile phone, desktop computer, laptop, tablet, and/or immersive reality device) to be able to seamlessly complete the checkout and payment operations using an application on a mobile phone even if the transaction was initiated using a different computing device. For example, the user may initiate the transaction using a device such as a laptop. In another example, the user may initiate the transaction using a merchant's application or a browser on the mobile phone. In yet another example, a user may initiate an in-session purchase transaction via an immersive reality device, such as an augmented reality or virtual reality device (e.g., headset, smart phone). In all of these scenarios, the user may want the system to hand off the checkout and payment operations to a secure application provided to the mobile phone of the user. Further, using the application provided to the mobile phone, the user may want to continue the checkout and payment operations without requiring reauthorization (e.g., without needing to be authenticated by inputting additional credentials).

Accordingly, as disclosed herein, buyers can access e-commerce platform functionality at multiple, different computing devices without exposing payment credentials and other sensitive data (e.g., PII). For example, a buyer may shop at a particular online store using a browser accessible via a primary device. Upon initiating a transaction at the primary device, the system may transfer the checkout process to a secondary device. The secondary device may have provided thereto an application structured to allow the buyer to perform secure electronic checkout and payment operations. As used herein, the term "provided to", when used with respect to an application, refers to the application being made available to the user at a particular computing device. In some embodiments, the application is installed on the computing device. In some embodiments, the application is executing on the computing device (e.g., via a browser) without being installed on the computing device. In some embodiments, the application is accessible at computing device via an emulator or a similar application delivery framework (e.g., Citrix, Azure, etc.), and is installed on and/or executing on a remote computing system relative to the computing device.

In some embodiments, an active authenticated session already exists on the secondary device. In some embodiments, a new active authenticated session is created at the secondary device. As used herein, the term "session" refers to a temporary and interactive information interchange between the secondary device and the e-commerce platform. For instance, the e-commerce platform may generate a session when the e-commerce platform completes a transaction associated with the user. In another example, the e-commerce platform may generate a session for the user when the e-commerce platform successfully authenticates the user. Accordingly, a "session" can be understood to be a secure electronic communication channel for exchanging data, instructions, electronic messages, and the like between the secondary device and the e-commerce platform. An "authenticated session" or "authorized authenticated session", as used herein, may refer to an active session that satisfies one or more thresholds, such as timing thresholds and/or user identifier thresholds.

The systems and methods described herein solve a technical problem of maintaining device and transaction security and minimizing PII exposure among devices when performing delegated authentication. In the above examples, a user can initiate a transaction using a primary device. The primary device may securely hand off a checkout and purchase session, via the e-commerce platform, to a trusted secondary device even if the primary device and the secondary device are not in secure communication with one another. An authorized authenticated session between the secondary device and the e-commerce platform allows for secure electronic communications related to transmission of payment credentials and other PII when completing the transaction. As a result, the payment credentials and other PII are not exposed to the primary device.

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
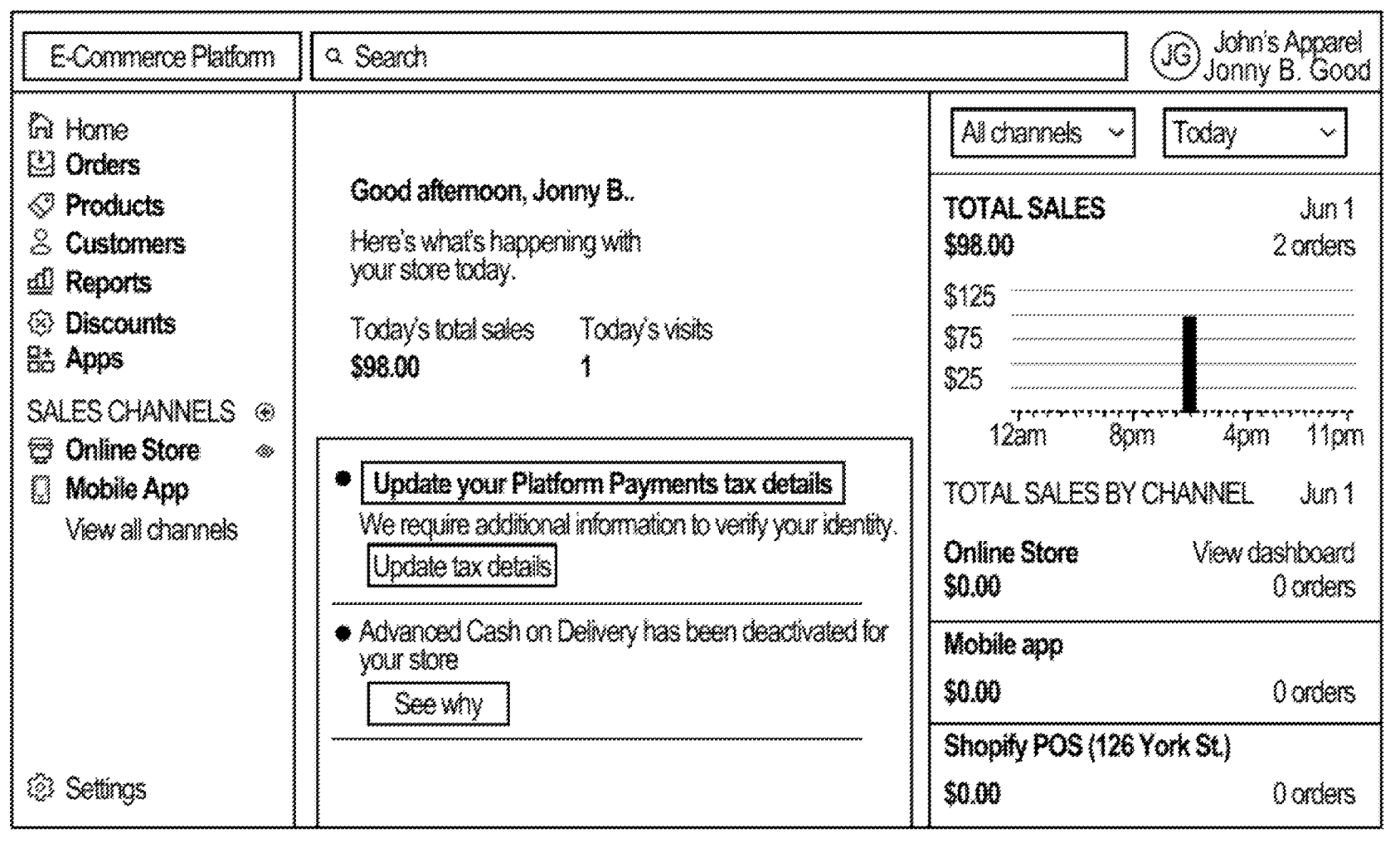

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, backpressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like). Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
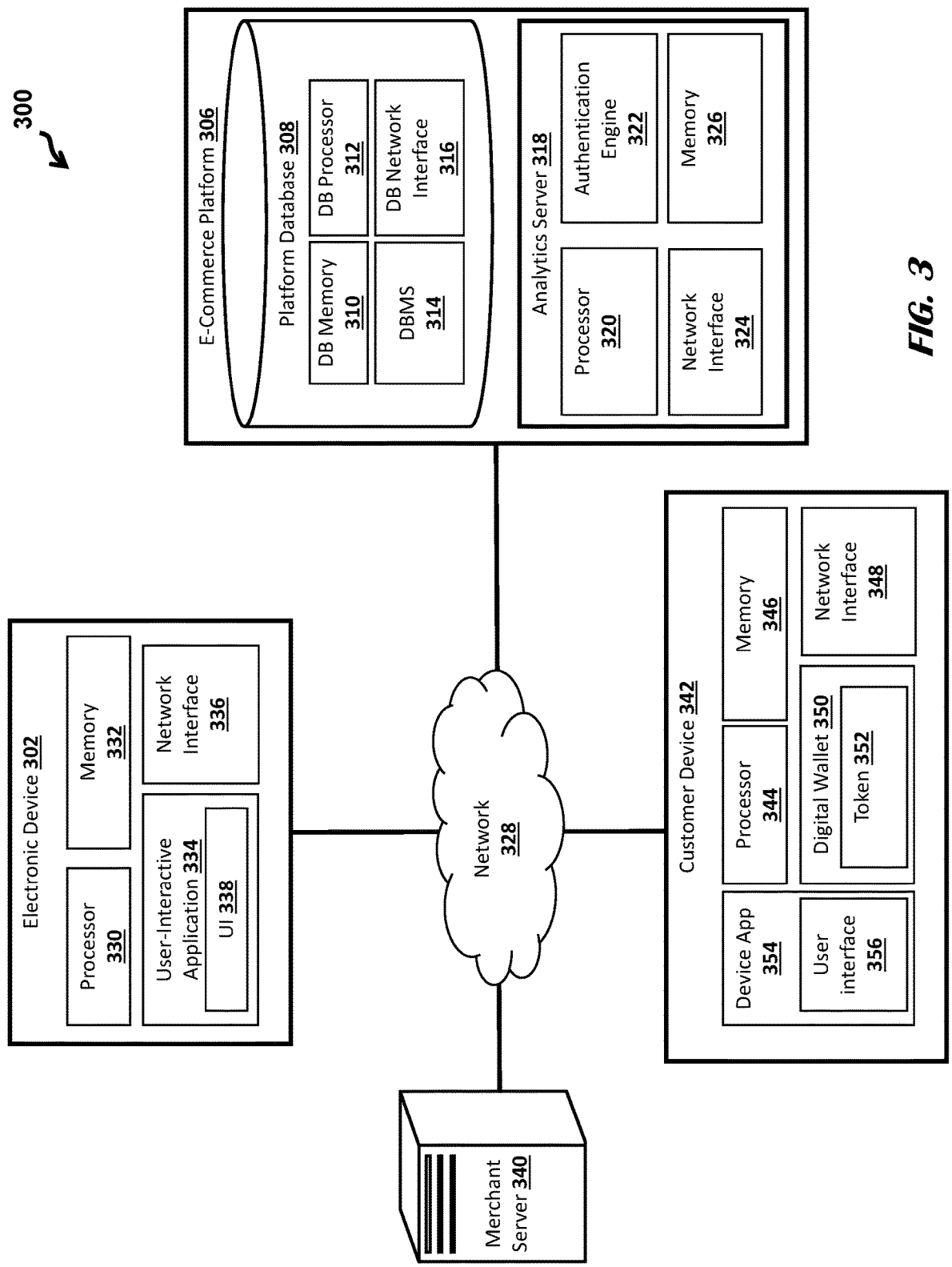
FIG. 3 shows components of an authentication system for multi-channel authentication using delegated credentials, according to an embodiment.

FIG. 3 illustrates components of an authentication system 300 for multi-channel authentication using delegated credentials, according to an embodiment. The authentication system 300 includes an electronic device 302, a customer device 342, and a merchant server 340 to connect with an e-commerce platform 306 via a network 328. The depicted authentication system 300 is described and shown in FIG. 3 as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the authentication system 300 or any number of additional or alternative devices not shown in FIG. 3. It should be appreciated that the network 328 may be implemented as a cellular network, a Wi-Fi network, or other wired local area network (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 340.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the electronic device 302, the merchant server 340, and/or the customer device 342. In some embodiments, a security device may be a physical device (e.g., a firewall). Additionally or alternatively, a security device may be a software application (e.g., Web Application Firewall (WAF)) that is hosted on, or otherwise integrated into, another computing device of the authentication system 300. The security devices monitoring web traffic are associated with, and administered by, the e-commerce platform 306.

The electronic device 302 may be any electronic device comprising hardware and software components capable of performing the various tasks and processes described herein. Non-limiting examples of the electronic device 302 may include mobile phones, tablets, laptops, personal computers, and/or immersive reality devices, among others. The electronic device 302 may include a processor 330, memory 332, user interface 338, and network interface 336. An example of a user interface 338 is a display screen (which may be a touch screen), a gesture recognition system, an eye tracking device, a keyboard, a stylus, a joystick, and/or a mouse. The network interface 336 is provided for communicating over the network 328. The structure of the network interface 336 will depend on how the electronic device 302 interfaces with the network 328. For example, if the electronic device 302 is a mobile phone or tablet, the network interface 336 may include a transmitter/receiver with an antenna to send and receive wireless transmissions to/from the network 328. The network interface 336 may include, for example, a network interface card (NIC), a computer port, and/or a network socket. The processor 330 directly performs or instructs all of the operations performed by the electronic device 302. Non-limiting examples of these operations include processing user inputs received from the user interface 338, preparing information for transmission over the network 328, processing data received over the network 328, and instructing a display screen to display information. The processor 330 may be implemented by one or more processors that execute instructions stored in the memory 332. Alternatively, some or all of the processor 330 may be implemented using dedicated circuitry, such as an ASIC, a GPU, or a programmed FPGA.

When communicating with components of the e-commerce platform 306, the electronic device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which website was accessed by a user operating the electronic device 302 (e.g., whether a customer operating the electronic device 302 has accessed a checkout page or requested to be authenticated).

In one example, a customer operating the electronic device 302 visits a website of a merchant (e.g., an online store of the merchant) hosted by the merchant server 340 using the application 334. The online store may include one or more features hosted (or otherwise produced or functionally controlled) by the analytics server 318. For instance, the analytics server 318 of the e-commerce platform 306 may provide (e.g., host) at least a portion of a webpage for the online store to the electronic device 302 (e.g., checkout page). The user-interactive application 334 may transmit and receive data packets in order to display various features of the online store on the user interface 338. The user-interactive application 334 (or other application) may connect the electronic device 302 to the analytics server 318 and/or the merchant server 340 using an IP address obtained by translating a domain name. The analytics server 318 and/or the merchant server 340 may execute code associated with the website and render the appropriate graphics to be presented to the user interface 338.

In another example, the electronic device 302 may be an immersive reality device and/or may be capable of supporting immersive reality features. Accordingly, an immersive reality environment may be rendered to the user via the user-interactive application 334 of the electronic device 302. The immersive reality environment may include user-interactive items available for purchase. Accordingly, the user may interact with the immersive reality environment to select various items for purchase.

In either of the above examples, a checkout and payment session for items selected by the user may be delegated to the customer device 342, as described further herein. Often, users may be reluctant or unwilling to provide login credentials at a storefront to complete a purchase, particularly if the purchasing activity is secondary to another activity (e.g., when a user is interacting with items in an immersive reality environment, playing a game, etc.). Further, the customer device 342 may be structured to establish and/or maintain an authorized authenticated session with the e-commerce platform thereon. The authorized authenticated session may allow for secure electronic communications related to transmission of payment credentials and other PII. Although the electronic device 302 may also maintain a secure electronic connection to the e-commerce platform 306 (e.g., for the purpose of retrieving purchasable items, merchant-related information, etc.), the electronic device 302 and the customer device 342 may not be in secure communication with each other. Accordingly, and as described further herein, a technical problem of maintaining device security and minimizing PII exposure among devices when performing delegated authentication is solved by allowing the electronic device 302 to securely hand-off a checkout and purchase session to the customer device 342 via the e-commerce platform 306.

As shown, the e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks (not shown) interconnecting the components of the e-commerce platform 306. The platform networks may comprise one or more public and/or private networks and include any number of hardware and/or software components capable of hosting and managing the networked communication among devices of the e-commerce platform 306.

As depicted in FIG. 3, the components of the e-commerce platform 306 include the analytics server 318 and a platform database 308. However, it should be appreciated that embodiments may include additional or alternative components capable of performing the operations described herein. In some implementations, certain components of the e-commerce platform 306 may be embodied in separate computing devices that are interconnected via one or more public and/or private internal networks (e.g., network 328). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages (or at least a portion of a webpage, such as the checkout portion) on behalf of merchants (e.g., online stores), security servers executing various types of software for monitoring web traffic (e.g., determining that a customer has reached a checkout page using the electronic device), and database servers hosting various platform databases 308 of the e-commerce platform 306, among others. The analytics server 318 may also perform various methods to authenticate the customer using authorized authenticated sessions and using the customer device 342.

The illustrative e-commerce platform 306 is shown and described as having only one analytics server 318 performing each of the various functions of the e-commerce service.

For instance, the analytics server 318 is described as serving the functions of executing the authentication engine 322 and a webserver (hosting webpages for online stores and account administration. It should, however, be appreciated that FIG. 3 is merely illustrative and that embodiments are not limited to the description of authentication system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318).

For example, some operations may be executed on a first computing device while other operations may be executed on a second computing device, such that the functions of the analytics server 318 are distributed among the various computing devices. In some implementations, the analytics server 318 may be a virtual machine (VM) that is virtualized and hosted on computing hardware configured to host any number of VMs.

The platform database 308 stores and manages data records concerning various aspects of the e-commerce platform 306, including information about, for example, actors (e.g., merchants, consumers, or platform administrators), electronic devices, merchant offerings (e.g., products, inventory, or services), authentication protocols, authentication credentials (e.g., user's passwords or other data needed for authenticating the customers) various metrics and statistics, machine-learning models, merchant pages hosting merchant stores, and other types of information related to the e-commerce platform 306 (e.g., usage and/or services).

The platform database 308 may also include various libraries and data tables including detailed data needed to perform the methods described herein, such as authenticating customers. For instance, the analytics server 318 may generate a data table associated with different browsers and their security features. The analytics server 318 may use this data table to determine whether the user-interactive application 334 executing on the electronic device 302 satisfies various security thresholds. In another example, the analytics server 318 may generate a data table associated with different risk appetites. As will be described below, the analytics server 318 may use different thresholds and rules based on various factors (e.g. customer attributes or transaction attributes). In order to identify the appropriate threshold or risk appetite, the analytics server 318 may query a data table stored with the platform database 308.

Various predetermined rules, regulations, and thresholds discussed herein may be set by the analytics server 318 or a system administrator of the e-commerce platform 306. Additionally or alternatively, the customer operating the customer device 342 and/or the merchant server 340 may input or modify the predetermined rules. For instance, the analytics server may keep a separate data table including a list of devices associated with a particular customer, which have been previously identified as secure and trusted (e.g., within a list of pre-authorized devices). However, a customer operating the customer device 304 may add or remove different devices from such a list.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS) 314 software, though a DBMS 314 is not required in every potential embodiment. It should be appreciated that the platform database 308 can be a single, integrated database structure or may be distributed into any number of database structures that are configured for some particular types of data needed by the e-commerce platform 306. For example, a first database could store user credentials and be accessed for authentication purposes, and a second database could store raw or compiled machine-readable software code (e.g., HTML, JavaScript) for webpages such that the DB memory 310 is configured to store information for hosting webpages.

The computing device hosting the platform database 308 may further include a DB network interface 324 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable, the DB network interface 324 may include, for example, a NIC, a computer port, and/or a network socket. The processor 320 directly performs or instructs all of the operations performed by the platform database 308.

Non-limiting examples of such operations may include processing queries or updates received from the analytics server 318, electronic device 302, customer device 342, and/or merchant server 349; preparing information for transmission via the platform network and/or the external networks 328; and processing data received via the platform network and/or the external networks 328. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The DB memory 310 of the platform database 308 may contain data records related to, for example, customer activity, and various information and metrics derived from web traffic involving customer accounts. The data may be accessible to the analytics server 318. The analytics server 318 may issue queries to the platform database 308 and data updates based upon, for example, successful or unsuccessful authentication sessions. As will be described below, the e-commerce platform 306 may generate sessions associated with instances of different customers successfully authenticating their device and/or successfully completing a checkout and payment operation.

The analytics server 318 may be any computing device that comprises a processor 320 and non-transitory machine-readable storage media (e.g., server memory 326) and that is capable of executing the software for one or more functions such as authentication engine 322. In some cases, the server memory 326 may store or otherwise contain the computer-executable software instructions, such as instruction needed to execute the authentication engine 322. The software and hardware components of the analytics server 318 enable the analytics server 318 to perform various operations that serve particular functions of the e-commerce platform 306.

For example, the analytics server 318 that serves as a webserver may execute various types of webserver software (e.g., Apache® or Microsoft IIS®). As another example, the analytics server 318 that serves as a security server may execute software for authenticating a customer using the customer device 342 when the request is received from the electronic device 302. It should be appreciated that these are merely examples and not intended to be limiting as to the potential arrangements or functions of the analytics server 318. Non-limiting examples of the analytics server 318 may include desktop computers, laptop computers, and tablet devices, among others.

The analytics server 318 may execute the authentication engine 322 that is structured to manage authorized authenticated sessions. The location of the authentication engine 322 is merely an example. The authentication engine 322 may be executed by the analytics server 318 and/or by the customer device 342 under the direction of the analytics server 318. Therefore, the authentication engine 322 can be performed locally on a customer's device or in the back-end of the system 300.

Additionally or alternatively, the authentication engine 322 could be provided by the e-commerce platform 306 as a separate web-based or cloud-based service. In some implementations, the authentication engine 322 is implemented at least in part by a user device such as the customer device 342. Other implementations of the authentication engine 322 are also contemplated such as a stand-alone service to authenticate users of any website. While the authentication engine 322 is shown as a single component of the e-commerce platform 306, the authentication engine 322 could be provided by multiple different components that are in networked communication with the analytics server 318 executing the authentication engine 322.

The customer device 342 may be any electronic device operated by a customer, such as a mobile phone, tablet, laptop, and the like. The customer device 342 may represent an electric device that is known and trusted by the analytics server 318. The customer device 304 includes a processor 344, memory 346, user interface 356, and network interface 348 that are functionally similar to the processor 330, memory 332, user interface 338, and network interface 336. For brevity, description of these features are not repeated. The customer device may also execute a device application 354 functionally similar to the user-interactive application 334. However, unlike the user-interactive application 334, the device application 354 may execute one or more security protocols that satisfy security thresholds and requirements imposed by the analytics server 318.

The customer device 342 may also include a digital wallet 350. The digital wallet 350 may be a software program provided to the customer device 342 that allows the customer to make electronic transactions in the online merchant store (hosted by the merchant server 340) using digital currency and/or using payment information associated with the customer. As will be described below, the digital wallet 350 may include a token 352 that allows the analytics server 318 to complete a checkout and payment operation between the customer and the merchant server 340. According to various embodiments, the token 352 may include payment credentials associated with a particular payment channel (e.g., channel 110A of FIG. 1). Accordingly, the token 352 may be generated and/or provided to the digital wallet 350 at the customer device 342 by the e-commerce platform 306 or by a third party independent from the e-commerce platform 306. In one example, the token 352 may be generated and provided to the customer device 342 by the analytics server 318. In another example, the token 352 may be generated and provided to the customer device 342 by a third-party computing system (not shown). According to various embodiments, the token 352 may be stored within the platform database 308 and/or in memory 346 of the customer device 342. Generally, the token 352 may include information sufficient to allow a user to perform check-out and payment operations. To that end, the token 352 may include various data elements, such as user identifying information, financial account information, and the like. When prompted, the analytics server 318 may invoke an application (e.g., device application 358) to complete the checkout and payment operation using the token 352.

The merchant server 340 may be any server associated with a merchant hosting an online store. The merchant server 340 may be any computing device hosting a website (or any other electronic platform) accessible to customers (e.g., via the electronic device 302 and the customer device 342) via the network 328. The merchant server 340 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the merchant server 340 may include workstation computers, laptop computers, server computers, laptop computers, and the like. While the authentication system 300 includes a single merchant server 340, in some embodiments the merchant server 340 may include a number of computing devices operating in a distributed computing environment.

The merchant server 340 may be configured to interact with one or more software modules of a same or a different types depicted within the authentication system 300. For instance, the merchant server 340 may execute software applications configured to host an electronic platform which may generate and serve various webpages to the electronic device 302. The electronic platform may also embed various graphical user interfaces generated by the analytics server 204. The online store hosted by the merchant server 340 may be configured to require user authentication based upon a set of user authorization credentials (e.g., username, password, biometrics, cryptographic certificate, and the like).

As shown, the electronic device 302 includes a user-interactive application 334. According to various embodiments, and as described further herein, the user-interactive application 334 may include a browser (e.g., such that a storefront associated with the merchant server 340 is provided to the user via the browser), a specialized shopping application provided to the electronic device 302 via the e-commerce platform 100 of FIG. 1, an immersive reality environment, etc. In operation, the user may interact with the user-interactive application 334 to select an item for purchase. For example, the user may access a storefront via a browser and place an item in an electronic shopping cart associated with the storefront. In another example (e.g., when the electronic device 302 is an immersive reality device), an immersive reality environment may be rendered to the user via the application 334. The immersive reality environment may include user-interactive items available for purchase. Accordingly, the user may select and mark a user-interactive item for purchase.

In either scenario described above (i.e. regardless of whether a user selects items at a storefront, via an immersive reality environment, etc.), the checkout and payment process may be delegated to the customer device 342. More specifically, the analytics server 318 may receive a message from the merchant server 340 that a user having a user identifier (e.g., a user name) has accessed a checkout page on a website hosted or otherwise associated with the merchant server 340. The message may also indicate that the user has utilized the electronic device 302. In another example, the analytics server 318 may receive the message directly from the electronic device 302. Upon receiving the message, the analytics server 318 may parse a user identifier from the message. The analytics server 318 may then identify and/or initiate an authorized authenticated session at the customer device 342. More specifically, an authorized authenticated session may be established between the device application 354 provided to the customer device 342 and the e-commerce platform 306. In the examples that follow, the device application 354 may be a shopping application structured to allow a user to perform secure checkout and payment for previously selected items.

In one example, the analytics server 318 may query the platform database 308 to identify an authenticated session associated with the user identifier. As a result, the analytics server 318 may identify that an authenticated session associated with the user identifier already exists on the customer device 342. The analytics server 318 may further analyze the authenticated session and determine that the authenticated session was generated within a predetermined time period. As a result, the analytics server may designate the authenticated session on the customer device 342 as an authorized authenticated session.

In another example, the analytics server 318 may determine that no active authenticated session exists. The analytics server 318 may query the platform database 308 to identify one or more previously authorized electronic devices of a user (e.g., a customer device 342). For example, the analytics server 318 may determine that a device application 354 has already been installed on or otherwise provided to a particular customer device 342. Accordingly, the analytics server 318 may cause the customer device 342 to initiate a new authorized authenticated session. In some embodiments, the analytics server 318 generates and provides to the customer device 342 a push notification structured to obtain user approval to initiate the checkout and payment process for items selected using the electronic device 302. In some embodiments, the analytics server 318 may cause the customer device 342 to initiate an active authenticated session prior to providing (e.g., displaying) the notification to the user. In some embodiments, the analytics server 318 may cause the customer device 342 to initiate an active authenticated session after receiving user authorization for the checkout and payment operations and/or after detecting a user interaction indicative of a user request to access the device application 354 on the customer device 342 (for example, to review the items in more detail, to modify product variants, quantity, shipping address, etc.).

The analytics server 318 then causes the customer device 342 to perform a checkout and payment operation using the token 352, whereby the application 354 authorizes the pending checkout and payment operation. In response to receiving an indication from the customer device 342 that checkout and payment operations has been authorized, the analytics server 318 may transmit a confirmation notification to the merchant server 340, the customer device 342, and/or the electronic device 302.

III. Example User Interfaces for Initiating a Purchase

Figure 4:
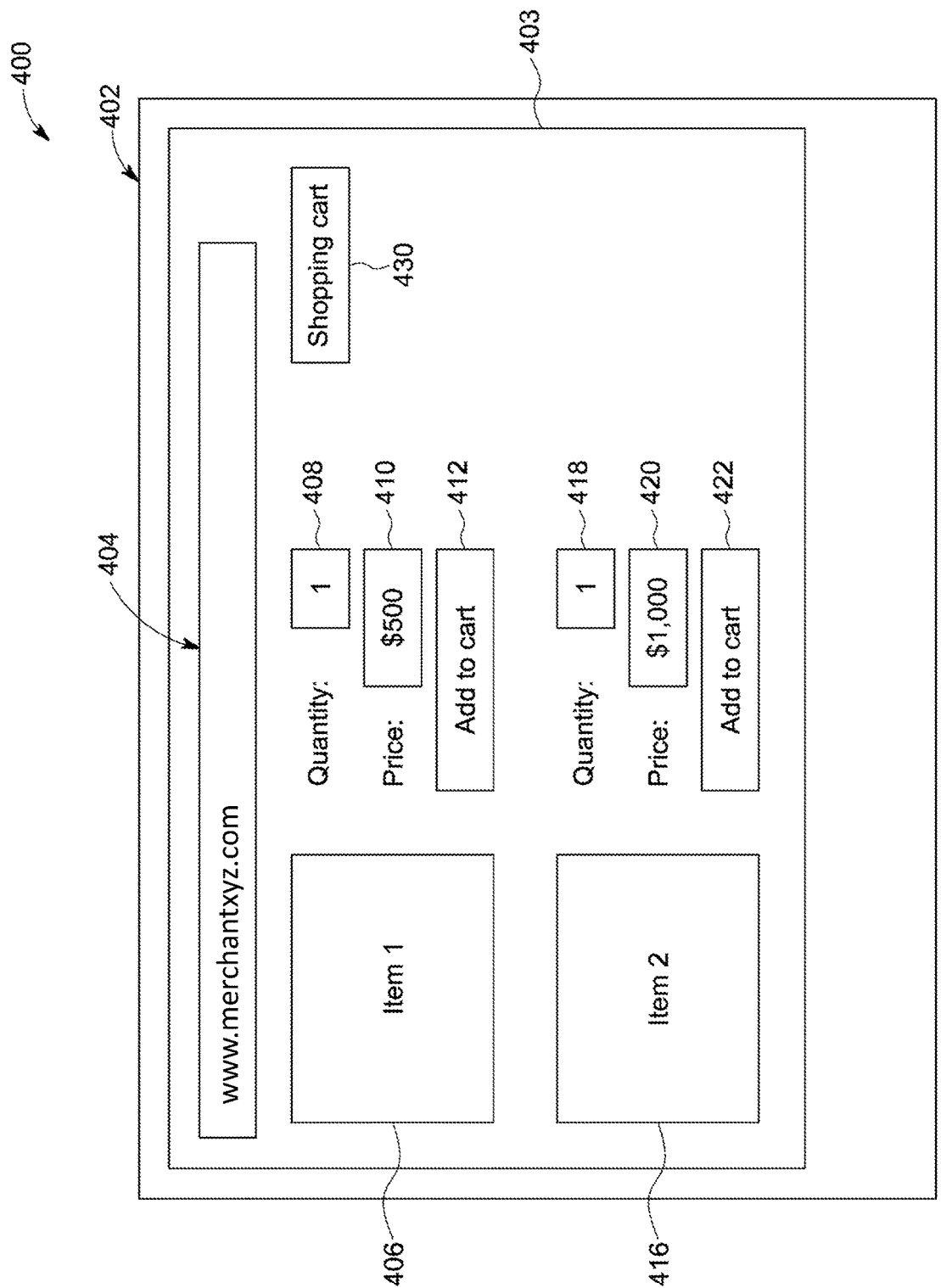
FIGS. 4-5 show electronic user interfaces structured to allow a user to initiate a checkout and payment operation using delegated credentials, according to various embodiments.
Figure 5:
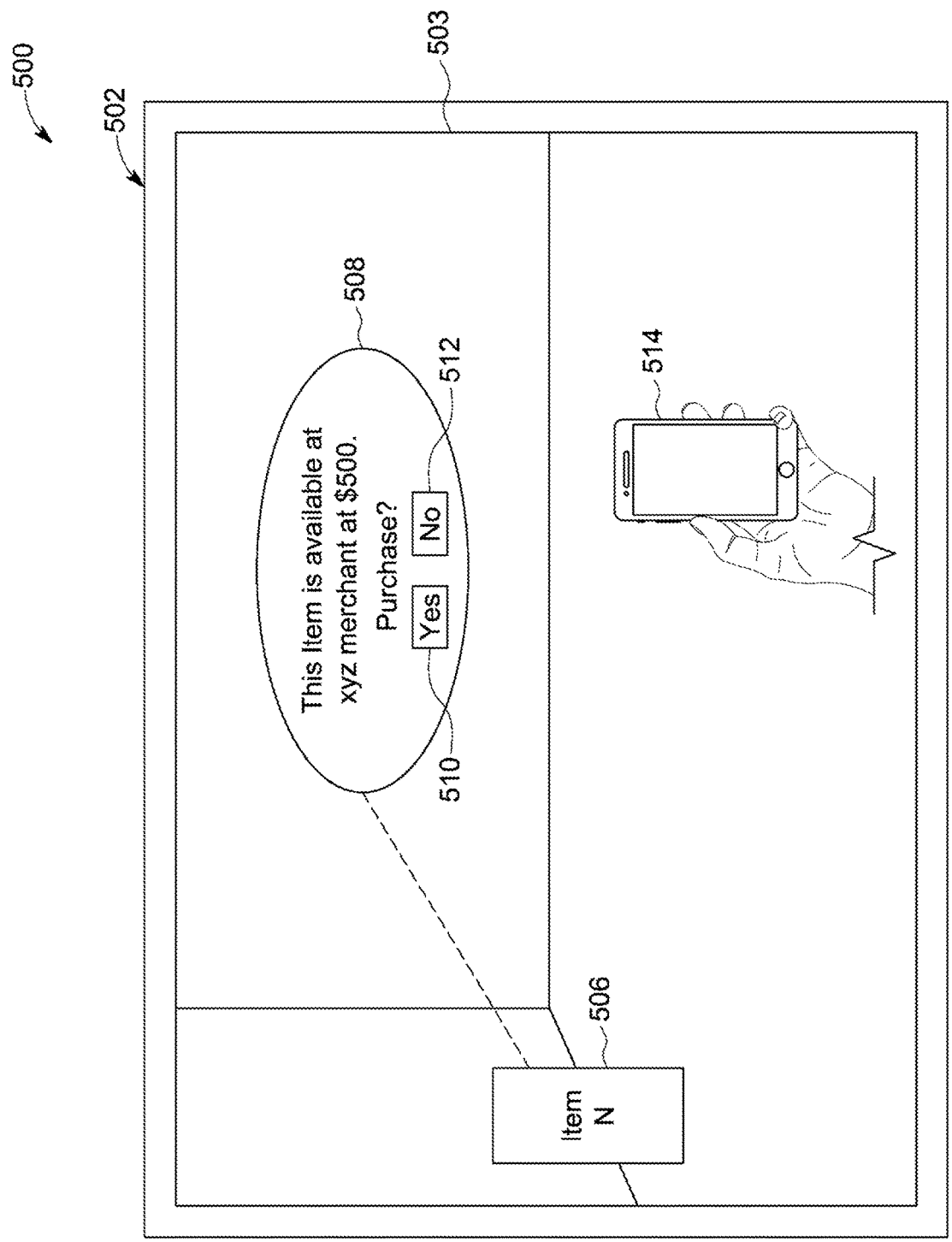

FIGS. 4 and 5 show electronic user interfaces structured to allow a user to initiate an electronic checkout and payment operation using delegated credentials, according to various embodiments. As shown in FIG. 4, a user may select an item for purchase using an application or a browser-based session, which may access and display to the user a storefront of a merchant. As shown in FIG. 5, a user may select an item for purchase via an immersive reality environment, which may access and display a storefront of a merchant or receive and render various items in a third-party immersive reality environment. These features are described in detail further herein.

FIG. 4 shows an electronic user interface 403 provided to the user via a display component of a computing device 402. In some embodiments, the computing device 402 (also sometimes referred to as a primary device) may be structured similarly to the electronic device 302 described in reference to FIG. 3. More generally, the computing device 402 may be a desktop, laptop, tabled, mobile phone, or a similar device structured to perform operations sufficient to display one or more purchasable items and enable a user to select one or more items for purchase.

To that end, the computing device 402 is shown to include the user interface 403. In some embodiments, the user interface 403 includes a browser provided to the computing device 402. In some embodiments, the user interface 403 is included in an application provided to the computing device 402. The user interface 403 is structured to allow a user to navigate to a network address 404, which may be associated with a storefront for a particular merchant or with another web-based resource that includes purchasable items (e.g., an interactive computer game, a third-party storefront, etc.).

As shown, the user interface 403 includes a plurality of user-selectable items. For example, the user-selectable items may include item 1 406 and item 2 416, which may be purchasable items. The user interface 403 may be structured to receive from a remote computing system (e.g., a merchant server 340 of FIG. 3) item 1 406 and/or item 2 416 and display the same to the user. The purchasable items may have associated thereto various inventory informational items, such as quantity (408, 418), price (410, 420), etc. Although not shown, the user interface 403 may be structured to receive (e.g., from the merchant server 340 of FIG. 3 and/or the e-commerce platform 306 of FIG. 3) additional information, such as, for example, storefront themes, merchant information, etc. In some embodiments, the user may be logged into the application that renders the user interface 403, and the user interface 403 may receive and render in a displayable form user information, such as user name, contact information, shipping address, payment credential information, etc. In some embodiments, the user may not be logged into the application but the computing device 402 may retrievably store in memory (e.g., in cached form, in a cookie file, etc.) at least some information associated with a previously logged in user, such as the user name, zip code, etc.

As shown, the user interface 403 includes a navigable control to a shopping cart 430. The shopping cart 430 may be associated with the storefront displayed via the user interface 403. The computing device 402 may be structured or remotely caused (e.g., by the e-commerce platform 306 of FIG. 3) to cause a shopping cart session to be initiated for the shopping cart 430. In some embodiments, a shopping cart session is created and/or updated when a user places an item (e.g., item 1 406) in the shopping cart 430. In some embodiments, a shopping cart session is created when a user first navigates to the network address 404. The shopping cart session may be shared with and/or persisted for at least a predetermined amount of time (e.g., 30 minutes, 1 hour, 12 hours, 24 hours, etc.) on a computing device associated with the e-commerce platform 306 (e.g., the analytics server 318 shown in FIG. 3).

The shopping cart session can have various information associated thereto, such as shopping cart information, product information, and/or payment information. The information associated with a shopping cart session for the shopping cart 430 may be enhanced as the user interacts with the user interface 403 to select purchasable items. For example, the shopping cart 430 may initially be empty and no shopping cart session may exist for the user. The user may interact with the user interface 403 to select item 1 406 for purchase. When the user places item 1 406 in the shopping cart 430, a new shopping cart session may be created for the user. At this point, the shopping cart session may include shopping cart information (e.g., shopping cart identifier, expiration date, etc.) and product information (e.g., product identifier/variant, quantity, price, etc.). If the user is not logged in, the shopping cart session may not include any authentication information (e.g., user name, PIN, password) or may include only incomplete information (e.g., a user/device identifier as described further herein.) Further, if the user is not logged in or if the user is logged in at the computing device 402 but has not enabled checkout and payment functionality (e.g., the digital wallet 350 of FIG. 3) on the computing device 402, the shopping cart session will not include any payment information (e.g., financial account number, payment token, such as token 352 o FIG. 3, expiration date, security verification code, account identifier for a digital wallet, financial institution identifier, etc.) Accordingly, the shopping cart session may be incomplete.

In some embodiments, in order to complete item checkout and purchase operations for items in shopping cart 430, an incomplete shopping cart session will need to be resolved. Accordingly, the computing device 402 may transmit shopping cart session data regarding the incomplete shopping cart session to the analytics server 318 of FIG. 3. As described further herein, the analytics server 318 of FIG. 3 may parse the shopping cart session information from the received data transmission and cause a customer device (e.g., customer device 342 of FIG. 3) to complete the checkout and payment operations.

In some embodiments, the customer device 402 behaves as both the electronic device 302 and customer device 342 of FIG. 3, such that the checkout and payment operations are completed on the same computing device 402. For example, a customer may close the browser session associated with the user interface 403 and the e-commerce platform 306 may use the incomplete shopping cart session information to identify the customer device 402 and transmit a push notification thereto prompting the customer to authorize the checkout and purchase operations. In some embodiments, the device 402 (e.g., the electronic device 302 of FIG. 3) is different from the customer device 342 of FIG. 3, such that the checkout and payment operations are completed on a computing device different from the computing device 402. For example, a customer may close the browser session associated with the user interface 403 and the e-commerce platform 306 may use the incomplete shopping cart session information to identify a different customer device 342 and transmit a push notification thereto asking the customer to complete the checkout and purchase operation.

FIG. 5 shows an immersive reality (e.g., augmented or virtual reality) user interface 503 provided to the user via a user environment rendering component (e.g., a display, a projected environment, a hologram, a speaker, a tactile input/output circuit, an olfactory input/output circuit, etc.) of an immersive reality device 502. In some embodiments, the immersive reality device 502 (also sometimes referred to as a primary device) may be structured similarly, at least in part, to the electronic device 302 described in reference to FIG. 3. More generally, the immersive reality device 502 may include a desktop, laptop, tablet, headset, and/or another computing device structured to generate and provide the immersive reality user interface 503 to a user. The immersive reality device 502 may further include user-interactive controls (e.g., an eye movement recognition circuit, a gesture recognition circuit, a joystick, a mouse, and/or another device structured to detect and accept user input). The immersive reality device 502 is structured to perform operations sufficient to render to the user, via one or more environment rendering components, information regarding one or more purchasable items and enable the user to select one or more items for purchase.

To that end, in some embodiments, the immersive reality device 502 may be structured to render to the user a storefront or site of a particular merchant. In some embodiments, the immersive reality device may be structured to render to the user particular items of merchandise (e.g., from the merchant server 340 of FIG. 3, from the e-commerce platform 306 of FIG. 3, etc.). The items of merchandise may be integrated into a particular immersive reality session rendered to the user via the immersive reality user interface 503. Although not shown, the immersive reality device 502 may be structured to receive (e.g., from the merchant server 340 of FIG. 3 and/or the e-commerce platform 306 of FIG. 3) additional information, such as storefront themes, merchant information, etc. In some embodiments, the user may be logged into the application that renders the immersive reality user interface 503, and the immersive reality user interface 503 may further receive and render user information, such as user name, contact information, shipping address, payment credential information, etc. In some embodiments, the user may not be logged into the application but the immersive reality device 502 may retrievably store in memory (e.g., in cached form, in a cookie file, etc.) at least some information associated with a previously logged in user, such as the user name, screen name, social media handle, zip code, etc.

In a non-limiting example used for illustrative purposes, the immersive reality device 502 may render to the user an immersive reality session associated with an interior design gaming application. The user may use the interior design gaming application to manipulate (e.g., select, remove, move, adjust) digitally rendered furniture items. At least some of the digitally rendered furniture items, such as item N 506, may be purchasable via a particular merchant associated with the e-commerce platform 306. Accordingly, when a user interacts with the item N 506 via the immersive reality user interface 503, the user may be provided with informational output 508 sufficient to make a purchasing decision. The informational output 508 may be provided to the user in visual, auditory, tactile or another suitable form or a combination thereof. As shown, the informational output 508 may include an item description, merchant information, item price, etc. The informational output 508 may further include user-interactive controls for accepting 510 or declining 512 a purchase transaction.

Upon detecting a user interaction with the control 510 for accepting the purchase transaction, the immersive reality device 502 may be structured or remotely caused (e.g., by the e-commerce platform 306 of FIG. 3) to cause a shopping cart session to be initiated for the immersive reality device 502. Accordingly, a shopping cart session may be created and/or updated when a user places an item (e.g., item N 506) for purchase. The shopping cart session may be shared with and/or persisted for at least a predetermined amount of time (e.g., 30 minutes, 1 hour, 12 hours, 24 hours, etc.) on a computing device associated with the e-commerce platform 306 (e.g., the analytics server 318 shown in FIG. 3). In some embodiments, an indication of the shopping cart session (e.g., a visual indication similar to the shopping cart 430 of FIG. 4, an auditory indication, etc.) is provided to the user via the immersive reality user interface 503.

The shopping cart session may have various information associated thereto and may have a lifecycle similar to that described relative to FIG. 4. Accordingly, when the user selects the item N 506 for purchase, the shopping cart session may be incomplete if the immersive reality device 502 does not also host a concurrent authorized authenticated session for the user with respect to the e-commerce platform 306 of FIG. 3. When the shopping cart session on the immersive reality device 502 is incomplete, the user may be redirected to a secondary device, such as the customer device 342 of FIG. 3, to complete the checkout and payment operations.

Accordingly, a push notification may be transmitted to the customer device 342 of FIG. 3 asking the customer to complete the checkout and purchase operations. The user may interact with the customer device 342 of FIG. 3 to complete the checkout and payment operations. In some arrangements, the immersive reality device 502 may be electronically paired to the customer device 342 of FIG. 3 (e.g., via Bluetooth, near-field communications (NFC), or another suitable communications protocol), such that the user interface of the customer device 342 is accessible at least in part via the immersive reality user interface 503. For example, the immersive reality user interface 503 may be structured to render to the user a digital representation 514 of the user interface 356 of FIG. 3. At least some of the user interface controls sufficient for the user to respond to the push notification received at the customer device 342 of FIG. 3 may be accessible to the user via the digital representation 514.

IV. Example User Interfaces for Authorizing a Purchase

Figure 6:
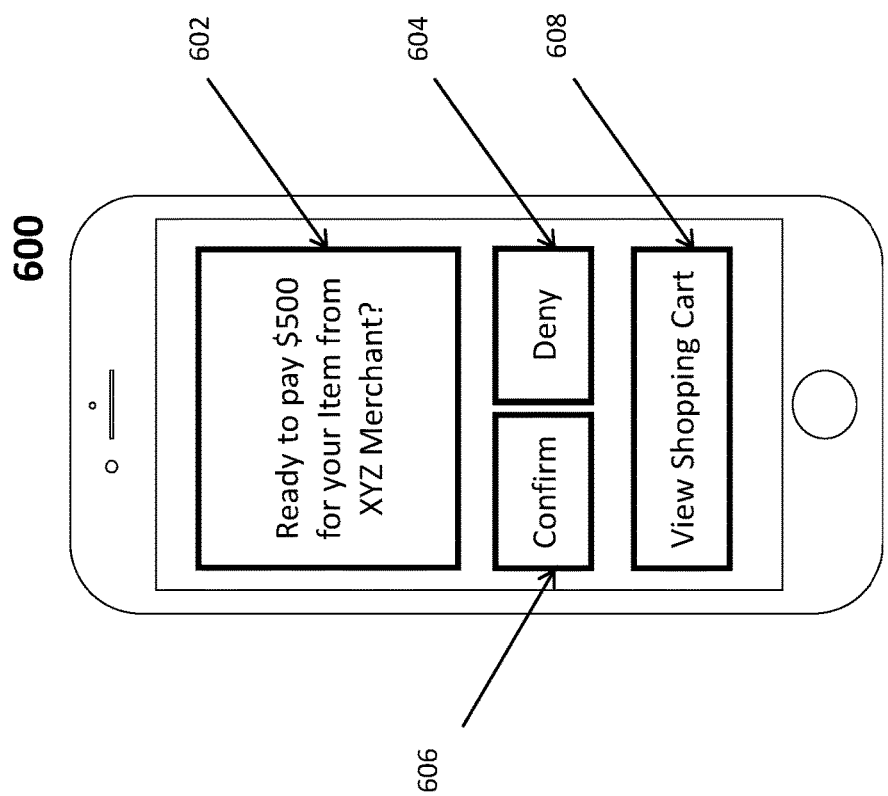
FIG. 6 shows an example notification displayed by an authentication system in multi-channel authentication using delegated credentials, according to an embodiment.

FIG. 6 shows a non-limiting example of a user interface for authentication using delegated credentials. The analytics server 318 of FIG. 3 may generate and provide a notification 602 for display on the customer device 342 of FIG. 3. In the depicted embodiment, the analytics server 318 determines that the user has downloaded an application hosted or otherwise associated with the analytics server 318 on a trusted secondary customer device 342 (shown herein as customer device 600). As a result, the analytics server 318 may transmit a push notification to the customer device 600. The push notification may include the text 602 that describes the purchase request (pending transaction). Specifically, the text 602 may include the item, price, and the online merchant's name. The push notification may also include the interactive buttons 604-608. As depicted, the user may utilize the interactive buttons 604 and 606 to confirm or deny the transaction. The user may also utilize the view shopping cart control 608 to view detailed data associated with the shopping cart. When the analytics server 318 receives an indication that the user has interacted with the view shopping cart control 608, the analytics server 318 directs the user to the website of the online merchant and/or displays the contents of the shopping cart via a full-functionality application.

Figure 7:
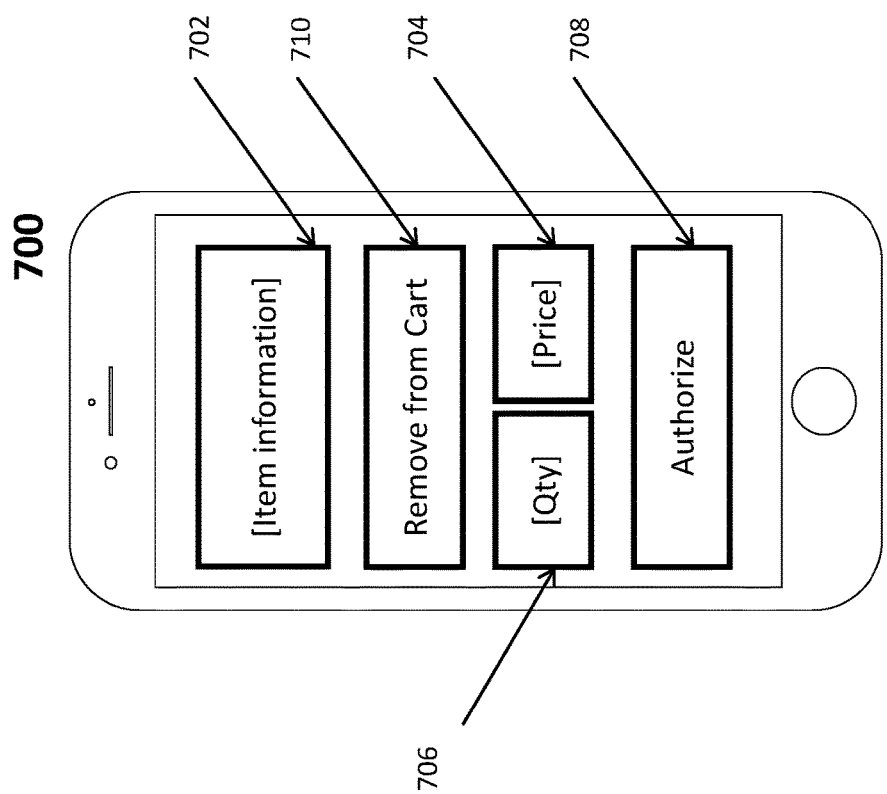
FIG. 7 shows an example shopping cart user interface accessible via the notification of FIG. 6, according to an embodiment.

FIG. 7 shows a non-limiting example of a shopping cart user interface accessible via the notification 602 of FIG. 6, according to an embodiment. A user may want to review and/or edit detailed line item information associated with a particular incomplete shopping cart session. Accordingly, the analytics server 318 or, more generally, the e-commerce platform 306 of FIG. 3 may invoke a full-functionality application, such as device application 354, on the customer device 342 of FIG. 3. As part of invoking the full-functionality application, the authentication engine 322 may establish a new authorized authenticated session on the customer device 342. As part of establishing the authorized authenticated session, the user may be prompted, at the customer device 342, to supply the login credentials for the buyer account (e.g., a user name or other identifier, a password, a PIN, digitized biometric information, such as a retinal or fingerprint scan, etc.).

As shown, customer device 342 may display a shopping cart user interface. According to various embodiments, the shopping cart user interface may include detailed, user-editable information, such as item information 702, price 704, and item quantity 706. Item information 702 may include item description, operating specifications, a digital image, a video, merchant information, and/or other information sufficient to inform the user of the specifics relating to a particular product variant. The user may modify the item quantity 706. The user may remove the item from the shopping cart using the remove from cart control 710, which, when interacted with by the user, may provide another user-interactive control (e.g., a pop-up box, etc.) prompting the user to permanently remove the item, move the item to a buy later list, move the item to a wish list, etc. Upon reviewing and editing one or more items in the shopping cart, the user may authorize completion of the checkout and payment operation for items in the shopping cart via the authorize control 708. Upon detecting a user interaction with the authorize control 708, the device application 354 may cause the customer device 342 to generate and transmit an electronic authorization message to the analytics server 318.

V. Example Methods of Authenticating Users Using Delegated Credentials

FIG. 8 illustrates a flowchart depicting operational steps for an authentication system for authenticating users using delegated credentials, in accordance with an embodiment. The method 800 describes how a server, such as the analytics server 318 of FIG. 3, can authenticate a user without requiring the user to input any sensitive information using the electronic device 302 where the purchase request was initiated. Even though the method 800 is described as being executed by the analytics server 318, the method 800 can be executed by any server and/or locally within a user's trusted device (e.g., customer device 342 of FIG. 3). Additionally or alternatively a server can execute the method 800 in other computer environments (other than the environments depicted in FIGS. 1-3). For instance, the method 800 can be executed by a server providing SaaS in a non-commerce infrastructure for any electronic platform (e.g., authenticating a user on any website regardless of whether the website is related to e-commerce).

Additionally or alternatively, the method 800 can be executed by a webserver acting as both a webserver and the analytics server by hosting the website and executing various authentication methods described herein. Furthermore, other configurations of the method 800 may comprise additional or alternative steps, or may omit one or more steps altogether.

In an embodiment, the method 800 includes operations to receive transaction information corresponding to an incomplete checkout operation (at step 802), transmit at least a subset of transaction information to a customer device (at step 804), cause the customer device to generate and display a notification comprising a request for user authorization to complete the incomplete checkout operation (at step 806), receive customer input indicative of instructions to complete the incomplete checkout operation (at step 808), and, responsive to receiving customer input, complete the incomplete checkout operation (at step 810). These operations are described below in more detail.

At 802, the analytics server 318 receives transaction information corresponding to an incomplete checkout operation (i.e. an incomplete shopping cart session). The transaction information may include a user identifier sufficient for the analytics server 318 to determine a secondary device where the user will be prompted to complete the checkout and payment operations.

The user may shop at a particular online store associated with the merchant server 340 of FIG. 3 using a browser or application accessible via the primary device, such as the electronic device 302 of FIG. 3, as described in relation to FIGS. 4 and 5. The user may build a shopping cart, including adding items, editing (e.g., changing a quantity of) items, deleting items, moving items from the shopping cart to another list or queue (e.g., a buy-later list, a wish list, etc.), and so forth. The shopping cart session information may be transmitted by the primary device to the analytics server 318 of the e-commerce platform 306 of FIG. 3. In some embodiments, the shopping cart information may be transmitted from the primary device substantially contemporaneously with detecting user activities that affect a shopping cart. In some embodiments, the primary device may determine that a browser session, application session, or an immersive reality session on the primary device has been terminated and/or that a user has been inactive for at least a predetermined amount of time (e.g., 1 minute, 5 minutes, 10 minutes, etc.) and then transmit shopping cart session information to the analytics server 316.

The analytics server 316 may initiate a digital fingerprinting process for delegated authentication based on the received shopping cart session information. The purpose of the digital fingerprinting process is to identify a trusted secondary user device (e.g., customer device 342), which can be used by the customer to complete the checkout and payment operations for the incomplete shopping cart session. The incomplete shopping cart session information may include a user identifier, which can be used in digital fingerprinting operations.

In one example, the incomplete shopping cart session information may include a user identifier utilized by the user to log into an application used to initiate the transaction. In various embodiments, the user identifier can include an email address, user name, social media handle, mobile phone number, etc. If a user is logged into the buyer's account for the e-commerce platform 306 on the primary device, the user identifier may include buyer account information (e.g., email address, user name, social media handle, mobile phone number, etc.). In another instance, if a user is logged into a third-party application (e.g., an immersive reality application, a social media website, etc.) and initiates the purchase request from that application, the user identifier may include third-party account information (e.g., email address, user name, social media handle, mobile phone number, etc.), and the analytics server 318 may cross-reference the third-party account information to buyer account information stored in the DBMS 314. The cross-referenced information may include a secondary device identifier where the user associated with the buyer account information can be prompted to complete the checkout and payment operations. The secondary device identifier may include any of an IP address, a MAC address, a Bluetooth device address, or similar information sufficient to identify the secondary device.

In another example, if the user is not logged into the buyer's account on the primary device and/or if the third-party account information cannot be cross-referenced to determine the secondary device identifier, the analytics server 318 may still attempt to determine the secondary device identifier based on the incomplete shopping cart session information. Accordingly, the incomplete shopping cart session information may include network-, hardware-, and/or software-related information that may constitute or correspond to or be included in the user identifier. For instance, the shopping session information may include an IP address, a wireless network SSID, a MAC address of the primary device, etc. After parsing the user identifier from the incomplete shopping cart session information, the analytics server 318 may identify a secondary device from a list of pre-authorized devices based on the user identifier and/or the network-, hardware- and/or software-related information. For example, the analytics server 318 may cross-reference the user identifier and/or the network-, hardware- and/or software-related information to a list of trusted computing devices retrievably stored in the platform database 308 of FIG. 3. Based on the cross-referenced information, the analytics server 318 may determine that the user identifier and/or the network-, hardware- and/or software-related information corresponds to a trusted secondary device.

More specifically, in a non-limiting example, the analytics server 318 may determine that a user is not currently logged in at any secondary device and no previously stored authenticated session information can be found for any secondary device. Based on the user identifier and/or the network-, hardware- and/or software-related information, the analytics server 318 may correlate the incomplete shopping cart session information from the primary device to a particular secondary device. For example, the user identifier may include an IP address, wireless network SSID information, or similar access network information likely to be shared by the primary device and the secondary device (e.g., if both devices are used in the same approximate physical location). Accordingly, the analytics server 318 may compare a partial IP address of the primary device to a set of previously received partial IP addresses associated with active authenticated sessions on various devices. In another example, wireless network SSID information may be compared instead of or in addition to partial IP addresses. If a match is found, the system may determine that a particular secondary device is likely associated with the user who initiated the transaction at the primary device.

After the secondary device is determined, the authentication engine 322 of the analytics server 318 may identify and/or attempt to establish an authorized authenticated session between the secondary device and the e-commerce platform 306. Information regarding previous authorized authenticated sessions may be transmitted from the secondary device to the authentication engine 322 and retrievably stored in the platform database 308. Accordingly, the authentication engine 322 may correlate the secondary device identifier to existing previously received information in order to determine if an authorized authenticated session exists. If no authorized authenticated session exists, a new authorized authenticated session between the secondary device and the e-commerce platform 306 may be established. As part of establishing the authorized authenticated session, the user may be prompted, at the secondary device, to supply the login credentials for the buyer account (e.g., a user name or other identifier, a password, a PIN, digitized biometric information, such as a retinal or fingerprint scan, etc.).

At 804, the analytics server 318 transmits at least a subset of transaction information to a customer device (e.g., the secondary device identified by the secondary device identifier). A push notification may be generated by the analytics server 318 and transmitted to the secondary device. The subset of transaction information may include a transaction summary, a number of items, item description(s), individual amounts and/or a total transaction amount. In some embodiments, the analytics server 318 may retrieve the relevant transaction information by accessing previously persisted information (e.g., in the platform database 308) corresponding to an incomplete shopping cart session initiated on the primary device. The number of items included in the push notification for transmission to the secondary device can be reduced to a data set sufficient for the buyer to approve or decline checkout and payment operations for the transaction. Accordingly, a technical improvement of conserving bandwidth in data transmission when sending the push notification to the secondary device can be achieved.

At 806, the analytics server 318 causes the customer device to generate and display a notification comprising a request for user authorization to complete the incomplete checkout operation. In some embodiments, the user may approve the transaction (i.e. cause the checkout and payment operations to be initiated and/or completed) by interacting directly with the push notification transmitted to the secondary device. In some embodiments, the secondary device may execute and/or invoke a full-functionality application to complete the checkout and payment operations. The secondary device may cause the application to display one or more authentication and/or confirmation prompts, as described above. The user may interact with the prompts to complete the checkout and payment operations.

At 808, the analytics server 318 receives customer input indicative of instructions to complete the incomplete checkout operation. Responsive to the customer input, the secondary device may generate and transmit to the analytics server 318 a token for the transaction. In some embodiments, the token may include a timestamp indicative of the creation and/or expiration time for the token. In some embodiments, various additional information sufficient to match the instruction to a particular incomplete shopping cart session may be included in the transmission to the analytics server 318. For example, the transmission may include a user identifier, a secondary device identifier, an incomplete shopping cart session identifier, etc. These identifiers may be used, individually or in combination, by the analytics server 318 to retrieve from the platform database 308 previously stored detailed information related to shopping cart items, such as an item identifier/product variant, quantity, price, merchant information, etc. These identifiers may also be used, individually or in combination, to retrieve previously stored buyer account information, such as an account identifier, user identifying information, default payment method, shipping address, etc. In some embodiments, the retrieved information may be used in combination with updated information provided by the user via the secondary device prior to providing input indicative of instructions to complete the incomplete checkout operation. For example, the user may have interacted with the view shopping cart control 608 of FIG. 6 to cause the secondary device to invoke a full-functionality application that displays further information regarding items in the shopping cart, as shown in FIG. 7. The user may have edited the information regarding items in the shopping cart prior to authorizing the completion of checkout and payment operations.

At 810, responsive to receiving customer input, the analytics server 318 completes the incomplete checkout operation. The analytics server 318 may parse a timestamp from the token received at 808 and authorize the transaction after verifying, based on the timestamp, that the token is not expired. In some embodiments, the token is retrieved from a digital wallet on the secondary device (e.g., the digital wallet 350 of FIG. 3) and/or includes the user's payment credentials. Accordingly, the analytics server 318 may parse digital wallet provider information from the token. The analytics server 318 may correlate the digital wallet provider information to a destination computing system address for the token provider and transmit, to the destination computing system address, an electronic message structured to provide an instruction to initiate a payment transaction. In some embodiments, the payment credentials may be stored in the platform database 308 of the e-commerce platform 306 and may be retrieved by the analytics server 318 to process the payment and complete the transaction.

In one embodiment, a method may comprise receiving, by a computer, a data transfer from a first application on an electronic device, the data transfer comprising transaction information corresponding to an incomplete checkout operation; transmitting, by the computer, at least a subset of the transaction information to a second application on a mobile device; causing, by the computer, the second application on the mobile device to generate and display a notification comprising a request for user authorization to complete the incomplete checkout operation; and responsive to receiving a user input for completing the incomplete checkout operation via the second application, completing, by the computer, the incomplete checkout operation.

In one aspect, completing the incomplete checkout operation may comprise authorizing, by the computer, a payment transaction.

The method may further comprise causing, by the computer, the second application on the mobile device to generate and display a shopping cart user interface, wherein the user input is received by the computer via the shopping cart user interface.

The computer may cause the second application to transmit a token for the transaction, the token corresponding to authorization of the transaction.

The method may further comprise parsing, by the computer, a timestamp from the token; and authorizing, by the computer, the transaction based on the timestamp.

The method may further comprise parsing, by the computer, digital wallet provider information from the token; correlating, by the computer, the digital wallet provider information to a destination computing system address; and transmitting, by the computer to the destination computing system address, an electronic message structured to provide an instruction to initiate the transaction.

The request for user authorization to complete the transaction may comprise invoking, by the computer, the second application to display a push notification.

The first application may execute on the mobile device.

The notification may comprise partial transaction information, the method may further comprise receiving, by the computer, from the second application, a request for additional transaction information; and transmitting, by the computer, the additional transaction information to the second application.

The computer may further use an active authorized authenticated session to authorize the transaction.

The computer may identify the second application using a user identifier parsed from the request.

The user identifier may comprise at least one of a social media handle, an IP address, a MAC address, a networking device identifier, and a wireless network service set identifier (SSID) associated with at least one of the electronic device or the first application.

The mobile device may be communicatively paired to the electronic device, and wherein second application provided to the mobile device may be enabled for user interaction, at least in part, via an input/output component of the electronic device.

In another embodiment, a non-transitory machine-readable storage medium having computer-executable instructions stored thereon that, when executed by one or more processors, may cause the one or more processors to perform operations comprising: receiving a data transfer from a first application on an electronic device, the data transfer comprising transaction information corresponding to an incomplete checkout operation; transmitting at least a subset of the transaction information to a second application on a mobile device; causing the second application on the mobile device to generate and display a notification comprising a request for user authorization to complete the incomplete checkout operation; and responsive to receiving a user input for completing the incomplete checkout operation via the second application, completing the incomplete checkout operation.

In one aspect, completing the incomplete checkout operation may comprise authorizing a payment transaction.

The operations may further comprise causing the second application on the mobile device to generate and display a shopping cart user interface, wherein the user input is received by the computer via the shopping cart user interface.

The operations may further comprise identifying the second application using a user identifier parsed from the request.

The user identifier may comprise at least one of a social media handle, an IP address, a MAC address, a networking device identifier, and a wireless network service set identifier (SSID) associated with at least one of the electronic device or the first application.

In another embodiment, a computer system comprising a memory and at least one processor, the memory having computer-executable instructions stored thereon that may cause the at least one processor to perform operations comprising: receiving a data transfer from a first application on an electronic device, the data transfer comprising transaction information corresponding to an incomplete checkout operation; transmitting at least a subset of the transaction information to a second application on a mobile device; causing the second application on the mobile device to generate and display a notification comprising a request for user authorization to complete the incomplete checkout operation; and responsive to receiving a user input for completing the incomplete checkout operation via the second application, completing the incomplete checkout operation.

In one aspect, completing the incomplete checkout operation may comprise authorizing a payment transaction.

The operations may further comprise causing the second application on the mobile device to generate and display a shopping cart user interface, wherein the user input is received by the computer via the shopping cart user interface.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a computer, a data transfer from a first application on an electronic device, the data transfer comprising transaction information corresponding to an incomplete checkout operation comprising at least one attribute of a shopping cart;
   transmitting, by the computer, at least a subset of the transaction information to a second application on a mobile device;
   causing, by the computer, the second application on the mobile device to generate and display a notification comprising a request for a user authorization instruction to complete the incomplete checkout operation; and
   responsive to receiving, via the second application, the user input authorization instruction to complete the incomplete checkout operation via the second application, completing, by the computer, the incomplete checkout operation based on the user authorization instruction.

2. The method of claim 1, wherein completing the incomplete checkout operation comprises authorizing, by the computer, a payment transaction.

3. The method of claim 1, further comprising causing, by the computer, the second application on the mobile device to generate and display a shopping cart user interface, wherein the user input is received by the computer via the shopping cart user interface.

4. The method of claim 1, wherein the computer causes the second application to transmit a token for the transaction, the token corresponding to authorization of the transaction.

5. The method of claim 4, further comprising:
   parsing, by the computer, a timestamp from the token; and
   authorizing, by the computer, the transaction based on the timestamp.

6. The method of claim 4, further comprising:
   parsing, by the computer, digital wallet provider information from the token;
   correlating, by the computer, the digital wallet provider information to a destination computing system address; and
   transmitting, by the computer to the destination computing system address, an electronic message structured to provide an instruction to initiate the transaction.

7. The method of claim 1, wherein the request for user authorization to complete the transaction comprises invoking, by the computer, the second application to display a push notification.

8. The method of claim 1, wherein the first application is executing on the mobile device.

9. The method of claim 1, wherein the notification comprises partial transaction information, the method further comprising:
   receiving, by the computer, from the second application, a request for additional transaction information; and
   transmitting, by the computer, the additional transaction information to the second application.

10. The method of claim 1, wherein the computer further uses an active authorized authenticated session to authorize the transaction.

11. The method of claim 1, wherein the computer identifies the second application using a user identifier parsed from the request.

12. The method of claim 11, wherein the user identifier comprises at least one of a social media handle, an IP address, a MAC address, a networking device identifier, and a wireless network service set identifier (SSID) associated with at least one of the electronic device or the first application.

13. The method of claim 1, wherein the mobile device is communicatively paired to the electronic device, and wherein the second application provided to the mobile device is enabled for user interaction, at least in part, via an input/output component of the electronic device.

14. A non-transitory machine-readable storage medium having computer-executable instructions stored thereon that, when executed by one or more processors, cause the one or more processors to perform operations comprising:
   receiving a data transfer from a first application on an electronic device, the data transfer comprising transaction information corresponding to an incomplete checkout operation comprising at least one attribute of a shopping cart;
   transmitting at least a subset of the transaction information to a second application on a mobile device;
   causing the second application on the mobile device to generate and display a notification comprising a request for user authorization instruction to complete the incomplete checkout operation; and
   responsive to receiving, via the second application, the user input authorization instruction to complete the incomplete checkout operation via the second application, completing the incomplete checkout operation based on the user authorization instruction.

15. The media of claim 14, wherein completing the incomplete checkout operation comprises authorizing a payment transaction.

16. The media of claim 14, further comprising causing the second application on the mobile device to generate and display a shopping cart user interface, wherein the user input is received by the computer via the shopping cart user interface.

17. The media of claim 14, further comprising identifying the second application using a user identifier parsed from the request.

18. The media of claim 17, wherein the user identifier comprises at least one of a social media handle, an IP address, a MAC address, a networking device identifier, and a wireless network service set identifier (SSID) associated with at least one of the electronic device or the first application.

19. A computer system comprising a memory and at least one processor, the memory having computer-executable instructions stored thereon that cause the at least one processor to perform operations comprising:
   receiving a data transfer from a first application on an electronic device, the data transfer comprising transaction information corresponding to an incomplete checkout operation comprising at least one attribute of a shopping cart;
   transmitting at least a subset of the transaction information to a second application on a mobile device;
   causing the second application on the mobile device to generate and display a notification comprising a request for user authorization instruction to complete the incomplete checkout operation; and
   responsive to receiving, via the second application, the user input authorization instruction to complete the incomplete checkout operation via the second application, completing the incomplete checkout operation based on the user authorization instruction.

20. The computer system of claim 19, wherein completing the incomplete checkout operation comprises authorizing a payment transaction.

21. The computer system of claim 19, the operations further comprising causing the second application on the mobile device to generate and display a shopping cart user interface, wherein the user input is received by the computer via the shopping cart user interface.

* * * * *